United States Patent
Iwamoto et al.

(10) Patent No.: US 9,919,661 B2
(45) Date of Patent: Mar. 20, 2018

(54) HARNESS PROTECTOR

(71) Applicant: HONDA MOTOR CO., LTD., Tokyo (JP)

(72) Inventors: Shohei Iwamoto, Wako (JP); Masakazu Hirai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/131,578

(22) Filed: Apr. 18, 2016

(65) Prior Publication Data

US 2016/0304036 A1 Oct. 20, 2016

(30) Foreign Application Priority Data

Apr. 16, 2015 (JP) ................................ 2015-083871

(51) Int. Cl.
*B60R 16/02* (2006.01)
*H02G 3/04* (2006.01)
*B60N 3/04* (2006.01)
*B60R 13/02* (2006.01)

(52) U.S. Cl.
CPC .......... *B60R 16/0215* (2013.01); *B60N 3/046* (2013.01); *B60R 13/0237* (2013.01); *B60R 13/0243* (2013.01); *H02G 3/0437* (2013.01)

(58) Field of Classification Search
CPC . B60N 3/046; B60R 13/0206; B60R 13/0237; B60R 13/0243; B60R 16/0215; B62D 25/025; H02G 3/0437
USPC ................................................ 296/208, 209
See application file for complete search history.

(56) References Cited

U.S. PATENT DOCUMENTS

| 3,078,116 A | * | 2/1963 | West | B62D 25/025 296/208 |
| 7,628,447 B2 | * | 12/2009 | Sugimoto | B60R 13/02 248/49 |
| 8,668,253 B2 | * | 3/2014 | Bauer | B60R 16/0215 296/1.08 |
| 2004/0108421 A1 | * | 6/2004 | Yuta | B60N 3/046 248/71 |
| 2011/0260025 A1 | * | 10/2011 | Aoshima | B60R 16/0215 248/231.81 |

(Continued)

FOREIGN PATENT DOCUMENTS

| JP | 51-8034 U | 1/1976 |
| JP | 59-135283 U | 9/1984 |

(Continued)

OTHER PUBLICATIONS

Office Action dated Feb. 7, 2017, issued in counterpart Japanese Patent Application No. 2015-083871, with English translation. (6 pages).

*Primary Examiner* — Jason S Daniels
(74) *Attorney, Agent, or Firm* — Westerman, Hattori, Daniels & Adrian, LLP (57) ABSTRACT

A harness protector is disposed on a side sill of a vehicle body to hold a harness routed along the side sill in a vehicle front-rear direction. The harness protector includes a housing disposed on an interior side of the side sill in a vehicle width direction and into which the harness is inserted, a fastening portion disposed above the side sill and to which a floor carpet covering the side sill and the housing is fastened, and a coupler that couples the housing and the fastening portion to each other.

5 Claims, 6 Drawing Sheets

(56) References Cited

U.S. PATENT DOCUMENTS

2014/0008501 A1* 1/2014 Satou ................ B60R 13/0275
248/68.1

FOREIGN PATENT DOCUMENTS

| JP | 2567752 Y2 | 4/1998 |
| JP | 2001-37040 A | 2/2001 |
| JP | 2002-274278 A | 9/2002 |
| JP | 2012-110086 A | 6/2012 |

* cited by examiner

HARNESS PROTECTOR

CROSS REFERENCES TO RELATED APPLICATIONS

The present application claims priority under 35 U.S.C. § 119 to Japanese Patent Application No. 2015-083871, filed Apr. 16, 2015, entitled "Harness Protector." The contents of this application are incorporated herein by reference in their entirety.

BACKGROUND

1. Field

The present disclosure relates to harness protectors.

2. Description of the Related Art

To date, harness protectors for protecting harnesses connected to various types of electric auto parts are known. For example, Japanese Registered Utility Model No. 2567752 discloses a harness protector of this type having such a configuration as to cover from above a harness routed along the upper surface of a side sill and to which an end portion of a floor carpet is fastened.

In this configuration, the side sill is a frame member that constitutes a lower side of a door opening. Thus, when the harness protector is disposed on the upper surface of the side sill, as in the case of Japanese Registered Utility Model No. 2567752, the area of the door opening decreases and the level of the lower side of the door opening rises. This configuration is thus susceptible to improvement for facilitating boarding and alighting operations of occupants.

SUMMARY

The present application describes a harness protector that facilitates boarding and alighting operations of occupants.

According to a first aspect of the disclosure, a harness protector (for example, a harness protector 41 according to an embodiment) is disposed on a side sill (for example, a side sill 2 according to an embodiment) of a vehicle body (for example, a vehicle body 21 according to an embodiment) to hold a harness (for example, a harness 35 according to an embodiment) routed along the side sill in a vehicle front-rear direction. The harness protector includes a housing (for example, a housing 42 according to an embodiment) disposed on an interior side of the side sill in a vehicle width direction and into which the harness is inserted, a fastening portion (for example, a fastening portion 45 according to an embodiment) disposed above the side sill and to which a floor carpet (for example, a floor carpet 71 according to an embodiment) covering the side sill and the housing is fastened, and a coupler (for example, a coupler 46 according to an embodiment) that couples the housing and the fastening portion to each other.

According to a second aspect of the disclosure, the harness protector may also include a first fixing portion (for example, a first fixing portion 43 according to an embodiment) that fixes the fastening portion onto the side sill. The fastening portion and the first fixing portion may be located at the same position in the vehicle front-rear direction.

According to a third aspect of the disclosure, the housing may include a first slope portion (for example, an internal wall 52 according to an embodiment) at a portion located on an interior side in the vehicle width direction, the first slope portion extending obliquely downward toward the interior side in the vehicle width direction.

According to a fourth aspect of the disclosure, the harness protector may also include a dent resistant portion (for example, a dent resistant portion 55 according to an embodiment) disposed so as to be continuous with the housing from a lower side of the housing and supporting the floor carpet from an exterior side in the vehicle width direction.

According to a fifth aspect of the disclosure, the dent resistant portion may include a second slope portion (for example, a lower extension portion 58 according to an embodiment) extending obliquely downward toward the interior side in the vehicle width direction and disposed so as to be continuous with the first slope portion.

According to a sixth aspect of the disclosure, the dent resistant portion may be disposed at a portion touchable by an occupant when a seat (for example, a seat 25 according to an embodiment) slidable in the vehicle front-rear direction is positioned in a rearmost position.

According to a seventh aspect of the disclosure, the harness protector may also include a second fixing portion (for example, a second fixing portion 44 according to an embodiment) disposed below the housing and at a position offset with respect to the dent resistant portion in the vehicle front-rear direction, the second fixing portion fixing the housing onto the side sill in the vehicle width direction.

According to the first aspect of the disclosure, the housing into which a harness is inserted is disposed on an interior side of the side sill in the vehicle width direction. Thus, the amount of the harness protector by which the harness protector protrudes upward beyond the side sill can be reduced. Thus, the area of the door opening formed above the side sill can be expanded and the height of the lower side of the door opening can be lowered. Consequently, boarding and alighting operations of occupants can be facilitated.

Unlike the case where the housing is disposed on the side sill, the width of the side sill in the vehicle width direction can be determined independently of the width of the housing. The side sill can thus be designed more freely, so that the interior space can be expanded by, for example, reducing the width of the side sill.

Moreover, the floor carpet can be fixed to the side sill using the fastening portions of the harness protector. This configuration thus dispenses with a separate member for fixing the floor carpet and the side sill to each other. Thus, the number of components can be reduced and the efficiency of the layout can be enhanced.

According to the second aspect of the disclosure, each first fixing portion and the corresponding fastening portion are positioned at the same position in the vehicle front-rear direction, whereby the strength of the fastening portion can be ensured. Even if, for example, the fastening portions are pulled via the floor carpet, the fastening portions are prevented from being damaged or broken.

According to the third aspect of the disclosure, the housing has a first slope portion at a portion disposed on the interior side in the vehicle width direction. This configuration prevents the foot of an occupant or the like from being caught on the housing or prevents the housing from being stamped from above at the time of boarding and alighting operations of occupants. Thus, the housing is prevented from being damaged or broken and is thus capable of protecting the harness for a long time.

According to the fourth aspect of the disclosure, the dent resistant portion is disposed in a space left below the housing and between the floor carpet and the side sill in the vehicle width direction. The dent resistant portion is thus capable of supporting the floor carpet from the exterior side in the vehicle width direction and capable of preventing a portion of the floor carpet disposed below the housing and facing the side sill in the vehicle width direction from being dented.

According to the fifth aspect of the disclosure, the dent resistant portion includes a second slope portion continuous with the first slope portion of the housing. This configuration thus prevents the foot of an occupant or the like from being caught on a boundary portion between the housing and the dent resistant portion or prevents the dent resistant portion from being stamped from above at the time of, for example, boarding and alighting operations or occupants. Thus, the dent resistant portion is prevented from being damaged or broken.

According to the sixth aspect of the disclosure, the dent resistant portion is disposed at a portion of the housing touchable by occupants when the seat is positioned in the rearmost position. The material costs can thus be reduced compared to the case, for example, where the dent resistant portion is disposed throughout the length of the housing.

According to the seventh aspect of the disclosure, the second fixing portion is disposed at a portion below the housing and offset with respect to the dent resistant portion in the front-rear direction. Thus, the second fixing portion is disposed at a portion set back from the housing to the exterior side in the vehicle width direction. Thus, the second fixing portion is less likely to be touched by an occupant with the floor carpet interposed therebetween, so that the second fixing portion is prevented from being unfastened, damaged, or broken.

DESCRIPTION OF THE PREFERRED EMBODIMENTS

Referring to the drawings, an embodiment of the disclosure is described now. In the following description, a case where a harness protector according to an embodiment of the disclosure is employed on a passenger seat of a vehicle is described. Unless particularly noted, the directions such as frontward, rearward, upward, downward, leftward, and rightward directions in the following description correspond to the directions in the vehicle. Throughout the drawings, the arrow UP indicates the upward direction and the arrow FR indicates the frontward direction.

Figure 1:
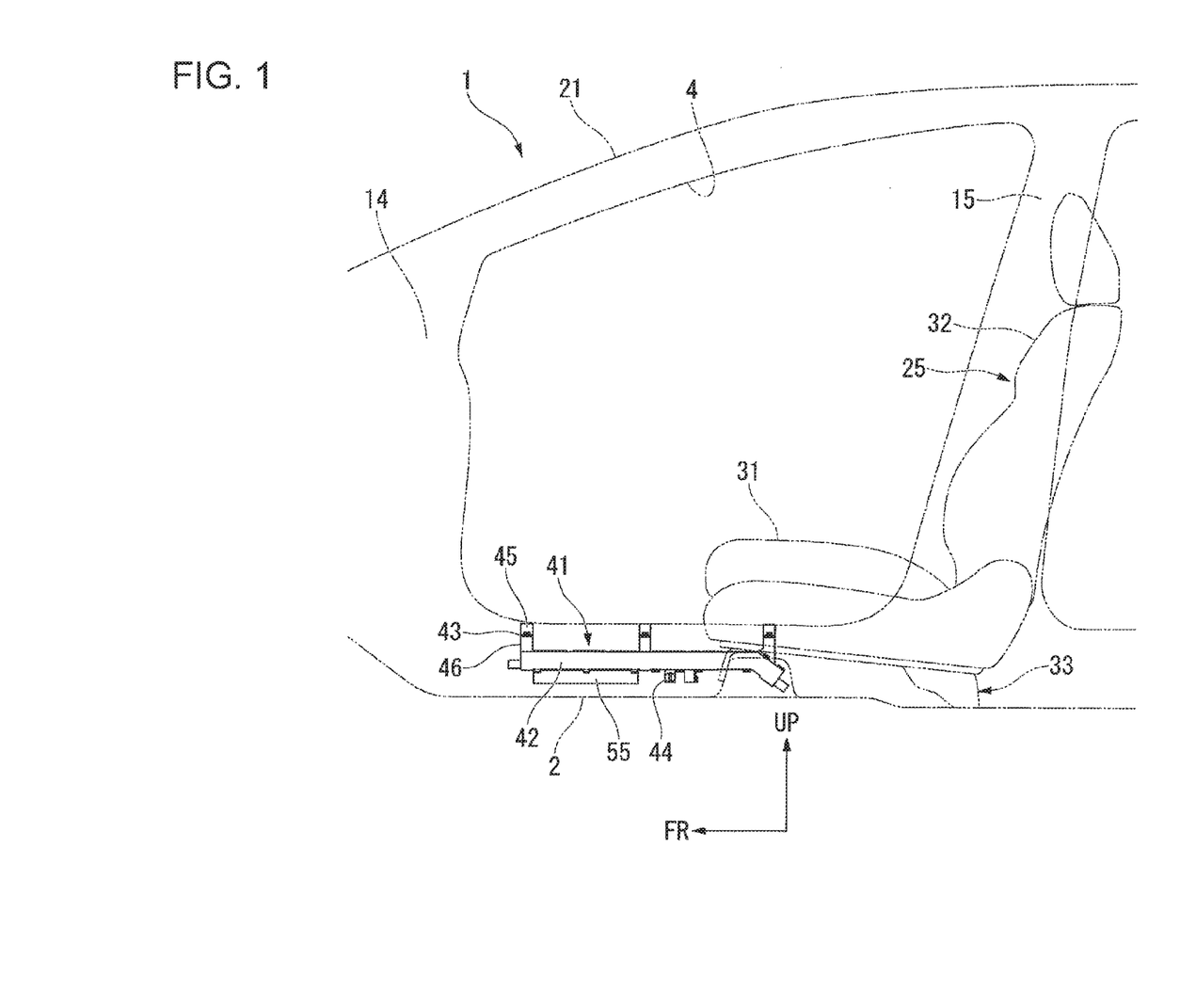
FIG. 1 is a side view of a portion of a vehicle including a harness protector according to an embodiment of the disclosure.

FIG. 1 is a side view of a portion of a vehicle 1 including a harness protector 41.

The vehicle 1 illustrated in FIG. 1 includes a pair of side sills 2 disposed on both sides in the vehicle width direction and extending in the vehicle front-rear direction (or simply, a front-rear direction, below).

Figure 2:
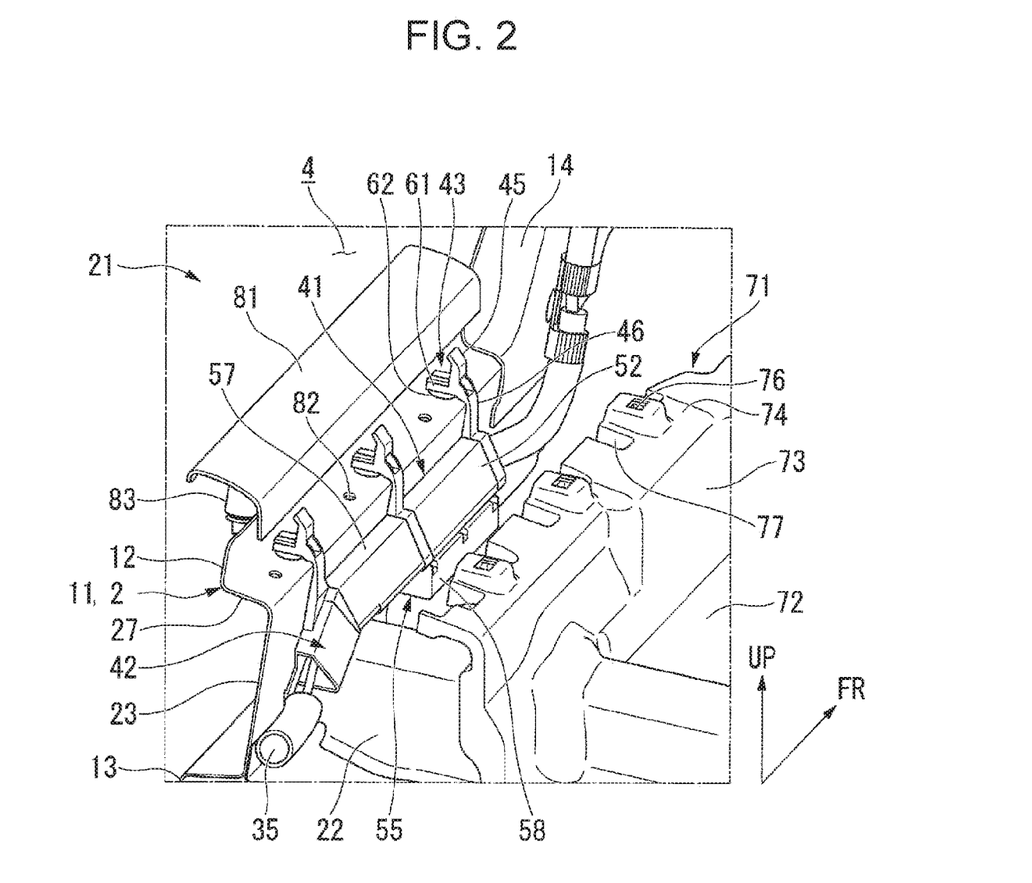
FIG. 2 illustrates a vehicle viewed from the interior side in the vehicle width direction and is an exploded perspective view from which a floor carpet and a step garnish are detached from a side sill.
Figure 3:
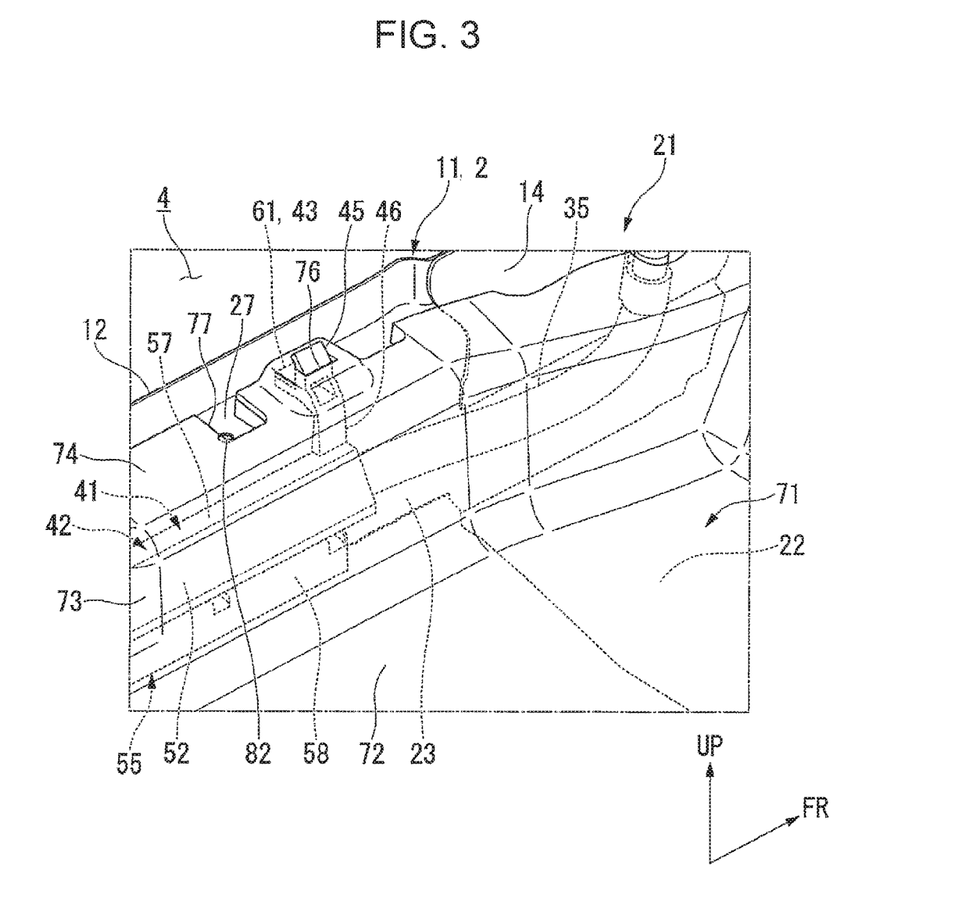
FIG. 3 is a perspective view of the vehicle viewed from the interior side in the vehicle width direction and illustrates the state where the step garnish is detached from the side sill.

FIG. 2 illustrates the vehicle 1 viewed from the interior side in the vehicle width direction and is an exploded perspective view from which a floor carpet 71 and a step garnish 81 are detached from the side sill 2. FIG. 3 is a perspective view of the vehicle 1 viewed from the interior side in the vehicle width direction and illustrates the state where the step garnish 81 is detached from the side sill 2.

As illustrated in FIG. 2 and FIG. 3, each side sill 2 is a frame member constituting a lower side of a front door opening 4 (or simply a door opening 4, below), which is rendered open or closed by opening or closing a front door, not illustrated. Each side sill 2 has a closed section when viewed in a cross section taken in the vehicle width direction. Specifically, each side sill 2 includes a side sill inner member 11, located on an interior side in the vehicle width direction, and a side sill outer member, not illustrated and joined to the side sill inner member 11 from the exterior side in the vehicle width direction. The side sill inner member 11 has, for example, a hat-shaped cross section that is open toward the exterior side in the vehicle width direction. The side sill inner member 11 includes an upper flange portion 12 and a lower flange portion 13, to each of which the above-described side sill outer member is joined. As illustrated in FIG. 1, each door opening 4 is formed into a rectangle in a side view by components such as the corresponding side sill 2, described above, a front pillar 14, and a center pillar 15.

As illustrated in FIG. 2 and FIG. 3, a floor panel 22, constituting a floor surface of the vehicle body 21, is disposed between the side sills 2. The floor panel 22 is formed by, for example, performing press forming on a steel sheet or plate and extends between the side sills 2. Both end portions of the floor panel 22 in the vehicle width direction are separately joined to lower portions of internal walls 23 of the respective side sill inner members 11, the internal walls 23 being located on the interior side in the vehicle width direction.

Figure 4:
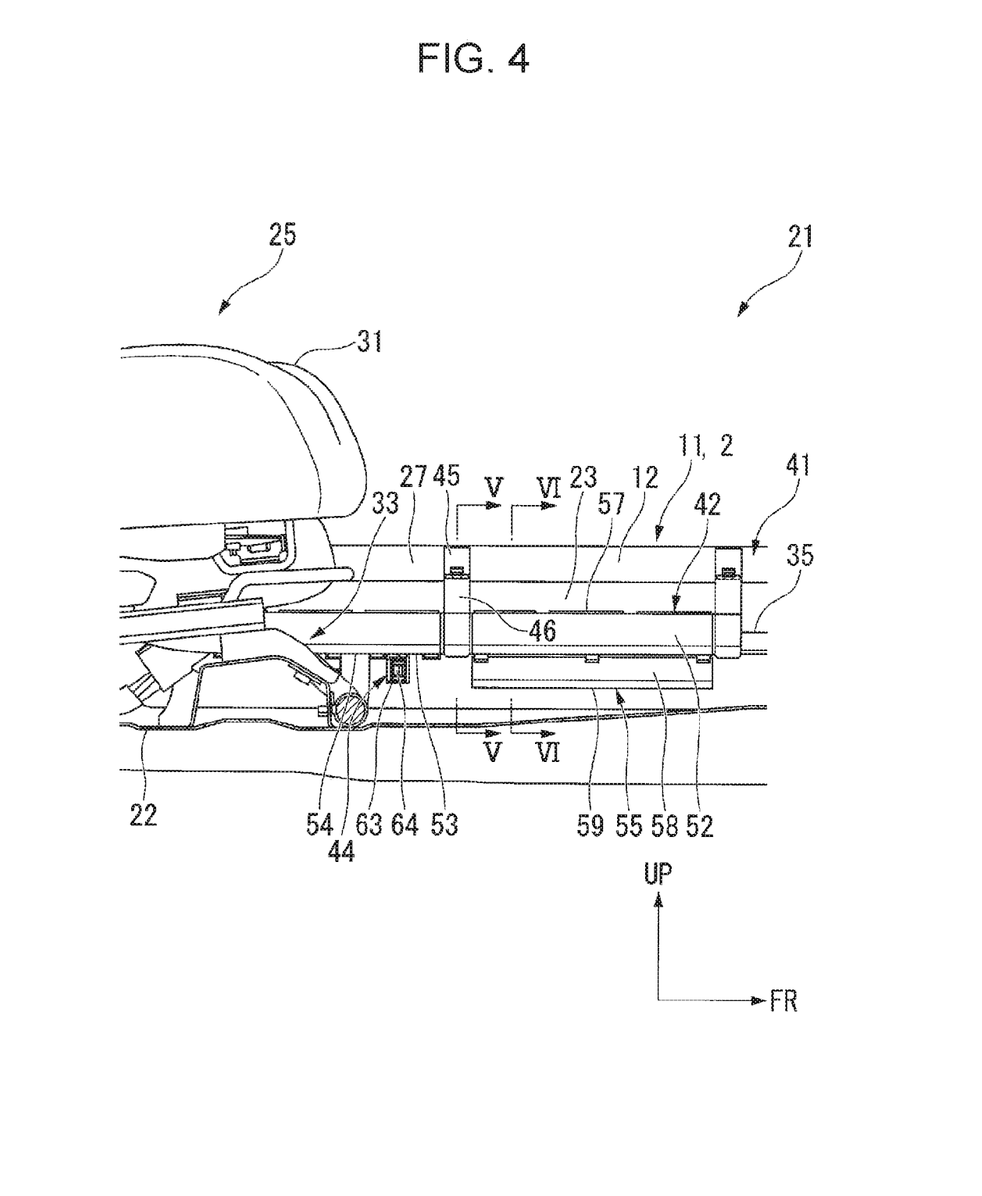
FIG. 4 is a cross-sectional view of the vehicle viewed from the interior side in the vehicle width direction.

FIG. 4 is a cross-sectional view of the vehicle 1 viewed from the interior side in the vehicle width direction. FIG. 4 does not illustrate the floor carpet 71 and the step garnish 81, which are described below.

As illustrated in FIG. 1 and FIG. 4, a seat 25 on which an occupant is seated is disposed on the floor panel 22. The seat 25 includes a seat cushion 31 and a seat back 32 (see FIG. 1) coupled to a rear end portion of the seat cushion 31 so as to be capable of tilting. The seat cushion 31 is supported so as to be slidable in the front-rear direction over the floor panel 22 using a seat rail 33. FIG. 4 illustrates an example in which the seat 25 is positioned at the rearmost position.

Figure 5:
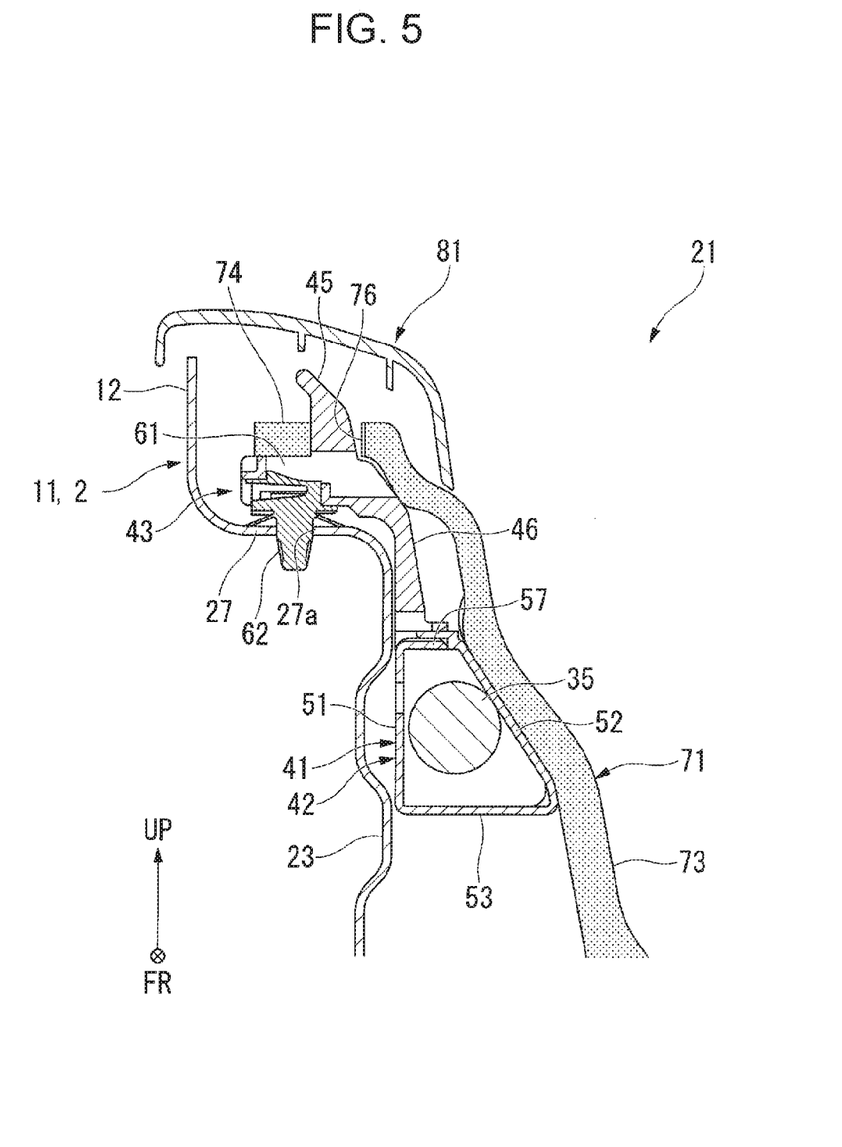
FIG. 5 is a cross-sectional view of the vehicle body taken along the line V-V of FIG. 4.
Figure 6:
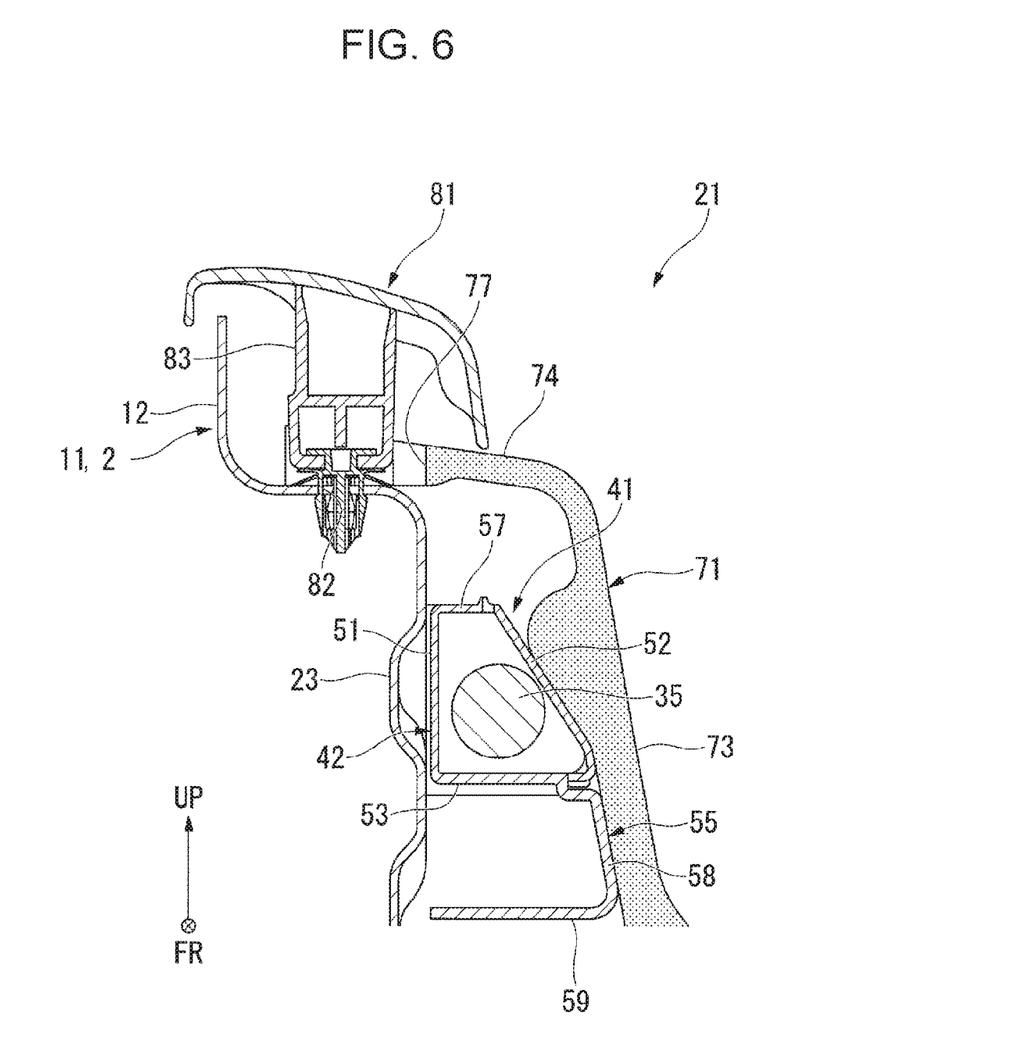
FIG. 6 is a cross-sectional view of the vehicle body taken along the line VI-VI of FIG. 4.

FIG. 5 is a cross-sectional view of the vehicle body 21 taken along the line V-V of FIG. 4 and FIG. 6 is a cross-sectional view of the vehicle body 21 taken along the line VI-VI of FIG. 4.

Here, as illustrated in FIG. 2 to FIG. 5, the harness protector 41, which protects the harness 35 connected to any of various types of electric components of the vehicle 1, is disposed on the above-described side sill inner member 11. The harness protector 41 includes a housing 42, which has a tubular shape to hold the harness 35, first fixing portions 43 and a second fixing portion 44, which fix the housing 42 to the side sill inner member 11, a fastening portion 45, to which the floor carpet 71 described below is fastened, and couplers 46, each of which couples the fastening portion 45 and the housing 42 together.

The housing 42 has a shape of a tube extending in the front-rear direction. The housing 42 extends along the internal wall 23 of the side sill inner member 11 on the interior side of the side sill inner member 11 in the vehicle width direction. The rear edge of the housing 42 according to the embodiment is positioned at the rear of the front edge of the seat cushion 31 of the seat 25 positioned in the rearmost position as illustrated in FIG. 4. The front edge of the housing 42 is positioned in front of the front edge of the seat cushion 31 of the seat 25 positioned in the foremost position. The housing 42 is disposed at a middle portion of the side sill inner member 11 in the vertical direction.

As illustrated in FIG. 5 and FIG. 6, the housing 42 has a trapezoidal shape in a cross section taken along the vehicle width direction. An external wall 51 of the housing 42, disposed on the exterior side of the housing 42 in the vehicle width direction, extends straight in the vertical direction and faces the internal wall 23 of the side sill inner member 11 in the vehicle width direction. On the other hand, an internal wall (first slope portion) 52 of the housing 42, disposed on the interior side in the vehicle width direction, is an inclined surface that extends obliquely downward toward the interior side in the vehicle width direction.

As illustrated in FIG. 4, a bottom wall portion 53 of the housing 42 has a harness opening 54 at a middle portion in the front-rear direction for connecting the inside and outside of the housing 42 to each other. The harness 35 is inserted into the housing 42 through the above-described harness opening 54 or the openings of the housing 42 at both ends in the front-rear direction and routed in the housing 42 in the front-rear direction. The design of the harness openings 54, such as the position or the number of harness openings 54, may be appropriately changed.

As illustrated in FIG. 4 or FIG. 6, a dent resistant portion 55, extending parallel to the housing 42, is disposed at a portion of the housing 42 (front portion of the housing 42) touchable by occupants when the seat 25 is positioned in the rearmost position. The dent resistant portion 55 supports the floor carpet 71 from the exterior side in the vehicle width direction. In other words, the dent resistant portion 55 is not disposed at a portion (rear portion of the housing 42) that is less likely to be touched by occupants when the seat 25 is positioned in the rearmost position. In this embodiment, the rear edge of the dent resistant portion 55 is positioned in front of the seat cushion 31 positioned in the rearmost position and the front edge of the dent resistant portion 55 is positioned at the rear of the front edge of the housing 42.

The dent resistant portion 55 has a shape of the letter L in a cross section taken in the vehicle width direction. Specifically, the dent resistant portion 55 includes a lower extension portion (second slope portion) 58, which extends downward from the bottom wall portion 53 of the housing 42, and an outer extension portion 59, which extends toward the exterior side in the vehicle width direction from the lower edge of the lower extension portion 58. The lower extension portion 58 forms an inclined surface that extends obliquely downward toward the interior side in the vehicle width direction. The contour of the lower extension portion 58 is smoothly continuous with the contour of the internal wall 52 of the housing 42.

As illustrated in FIG. 2 to FIG. 5, each coupler 46 has a shape of the letter L in a front view, viewed in the front-rear direction. Specifically, each coupler 46 has an elongated body that extends upward from an upper wall portion 57 of the housing 42 along the internal wall 23 of the side sill inner member 11 and is then bent toward the exterior side in the vehicle width direction to extend over an upper wall portion 27 of the side sill inner member 11. The couplers 46 are disposed at multiple portions (three portions in the illustration) at intervals in the front-rear direction. That is, the upper end of each coupler 46 is attached to the upper wall portion 27 of the side sill inner member 11, and the lower and of the coupler 46 is attached to the upper wall portion 57 of the housing 42, thereby supporting the housing 42 at a position adjacent to the vehicle inner side of the side sill. The fastening portion 45 for supporting the side edge of the floor carpet 71 can be provided to the upper portion of the coupler 46 in the vicinity of the upper end of the coupler 46.

As illustrated in FIG. 5, each first fixing portion 43 includes a mount base 61 and a clip 62 attached to the mount base 61. The mount base 61 extends from an upper end portion of each coupler 46 (a portion positioned above the upper wall portion 27 of the side sill inner member 11) further toward the exterior side in the vehicle width direction. As illustrated in FIG. 5, the clip 62 protrudes downward from the mount base 61 and gradually tapers downward. The clip 62 of each first fixing portion 43 is fitted into a corresponding fit hole 27a that extends through the upper wall portion 27 of the side sill inner member 11 in the vertical direction. The harness protector 41 according to the embodiment is thus supported by the housing 42 hung on the upper wall portion 27 of the side sill inner member 11 with the first fixing portions 43 and the couplers 46 interposed therebetween.

As illustrated in FIG. 4, the second fixing portion 44 includes a mount base 63 and a clip 64 attached to the mount base 63. The mount base 63 extends downward from a portion of the bottom wall portion 53 of the housing 42 positioned at the rear of the dent resistant portion 55. The clip 64 protrudes from the mount base 63 toward the exterior side in the vehicle width direction and gradually tapers toward the exterior side in the vehicle width direction. The clip 64 of the second fixing portion 44 is fitted into a fit hole, not illustrated, extending through the internal wall 23 of the side sill inner member 11 in the vehicle width direction.

As illustrated in FIG. 2, FIG. 3, FIG. 5, and FIG. 6, each fastening portion 45 has a plate shape standing erect upward from an upper end portion of the corresponding coupler 46. Here, each fastening portion 45 is positioned on the interior side of the above-described first fixing portion 43 in the vehicle width direction and at the same position in the front-rear direction. Each fastening portion 45 extends obliquely upward toward the exterior side in the vehicle width direction. A fastening hole 76 of the floor carpet 71 is fastened on the corresponding fastening portion 45.

The floor carpet 71 is laid over the floor panel 22 and the side sill inner members 11 to cover the floor panel 22, the side sill inner members 11, and the harness protectors 41 from the vehicle interior. The floor carpet 71 includes a panel covering portion 72, which covers the floor panel 22, rising portions 73, which rise upward from both end portions of the panel covering portion 72 in the vehicle width direction, and overhanging portions 74, which hang over to the exterior side in the vehicle width direction from the upper edges of the rising portions 73.

As illustrated in FIG. 5 and FIG. 6, each rising portion 73 is disposed at a distance from the side sill inner member 11 in the vehicle width direction and covers the internal wall 23 of the side sill inner member 11 and the harness protector 41 from the interior side in the vehicle width direction. Each rising portion 73 extends obliquely upward to the exterior side in the vehicle width direction. Here, in the external surface of the rising portion 73 facing outward in the vehicle width direction, a portion that faces the housing 42 and the dent resistant portion 55 of the harness protector 41 in the vehicle width direction extends so as to follow the shapes of the internal wall 52 of the housing 42 and the lower extension portion 58 of the dent resistant portion 55. Specifically, the external surface of the rising portion 73 is positioned on the interior side, in the vehicle width direction, of the internal wall 52 of the housing 42 and the lower extension portion 58 of the dent resistant portion 55 while being adjacent to or in contact with the internal wall 52 and the lower extension portion 58. Thus, the external surface of the rising portion 73 is supported by the housing 42 and the dent resistant portion 55 from the exterior side in the vehicle width direction.

As illustrated in FIG. 2, FIG. 3, FIG. 5, and FIG. 6, each overhanging portion 74 covers the upper wall portion 57 of the housing 42 from above. Each overhanging portion 74 has fastening holes 76 at portions corresponding to the above-described fastening portions 45 of the harness protector 41. The fastening holes 76 extend through the overhanging portion 74 in the vertical direction. To each fastening hole 76, the corresponding fastening portion 45 of the harness protector 41 is fastened. Thus, the floor carpet 71 is fixed to the side sill inner member 11 with the harness protector 41 interposed therebetween.

Each overhanging portion 74 has a relief hole 77 at a portion between each pair of fastening holes 76 adjacent to each other in the front-rear direction. Each relief hole 77 renders the upper wall portion 57 of the housing 42 exposed. Each relief hole 77 extends through the overhanging portion 74 in the vertical direction and is open toward the exterior side in the vehicle width direction. The upper wall portion 57 of the housing 42 has attachment holes 82 at portions exposed through the relief holes 77 for attaching the step garnish 81, described below.

The step garnish 81, mentioned above, has a shape of the letter U that is open downward in a cross section taken in the vehicle width direction and extends in the front-rear direction. The step garnish 81 is disposed above the side sill 2 and covers portions of the harness protector 41 and the floor carpet 71 located above the upper wall portion 57 of the housing 42 (such as the fastening portion 45, the first fixing portion 43, and the overhanging portion 74) from above or from both sides in the vehicle width direction.

Attachment pins 83, fitted into the attachment holes 82 of the side sill inner member 11, extend downward from portions of an upper wall portion of the step garnish 81 corresponding to the relief holes 77 of the above-described floor carpet 71. Each attachment pin 83 extends through the overhanging portion 74 of the floor carpet 71 through the corresponding relief hole 77 and fitted into the corresponding attachment hole 82 of the floor carpet 71.

In this manner, in this embodiment, the housing 42 into which the harness 35 is inserted is disposed on the interior side of the side sill 2 in the vehicle width direction. Thus, the amount of the harness protector 41 by which the harness protector 41 protrudes upward from the side sill 2 can be reduced. Thus, the area of the door opening 4 formed above the side sill 2 can be expanded and the height of the lower side of the door opening 4 can be lowered. Consequently, boarding and alighting operations of occupants can be facilitated.

Unlike the case where the housing 42 is disposed on the side sill 2, the width of the side sill 2 in the vehicle width direction can be determined independently of the width of the housing 42. The side sill 2 can thus be designed more freely, so that the interior space can be expanded by, for example, reducing the width of the side sill 2.

Moreover, in this embodiment, the floor carpet 71 can be fixed to the side sill 2 using the fastening portions 45 of the harness protector 41. This configuration thus dispenses with a separate member for fixing the floor carpet 71 and the side sill 2 to each other. Thus, the number of components can be reduced and the efficiency of the layout can be enhanced.

In this embodiment, each first fixing portion 43 is positioned at the same position as the corresponding fastening portion 45 in the front-rear direction, whereby the strength of the fastening portion 45 can be ensured. Even if, for example, the fastening portions 45 are pulled via the floor carpet 71, the fastening portions 45 are prevented from being damaged or broken.

In addition, the internal wall 52 of the housing 42 has a slope surface. Thus, in contrast to the case, for example, where the internal wall 52 is formed so as to extend linearly in the vertical direction, this configuration prevents the foot of an occupant or the like from being caught on the internal wall 52 or prevents the housing 42 from being stamped from above at the time of boarding and alighting operations of occupants. Thus, the housing 42 is prevented from being damaged or broken and is thus capable of protecting the harness 35 for a long time.

In this embodiment, the dent resistant portion 55 is disposed in a space left below the housing 42 and between the floor carpet 71 and the side sill inner member 11 in the vehicle width direction. The dent resistant portion 55 is thus capable of supporting the floor carpet 71 from the exterior side in the vehicle width direction and capable of preventing a portion of the floor carpet 71 disposed below the housing 42 and facing the side sill inner member 11 in the vehicle width direction from being dented.

In addition, the lower extension portion 58 of the dent resistant portion 55 obliquely extends so as to be continuous with the internal wall 52 of the housing 42. This configuration thus prevents the foot of an occupant or the like from being caught on a boundary portion between the housing 42 and the dent resistant portion 55 or prevents the dent resistant portion 55 from being stamped from above at the time of, for example, boarding and alighting operations of occupants. Thus, the dent resistant portion 55 is prevented from being damaged or broken.

In addition, the dent resistant portion 55 is disposed at a portion of the housing 42 touchable by occupants when the seat 25 is positioned in the rearmost position. The material costs can thus be reduced compared to the case, for example, where the dent resistant portion 55 is disposed throughout the length of the housing 42.

In this embodiment, the second fixing portion 44 is disposed at a portion below the housing 42 and offset with respect to the dent resistant portion 55 in the front-rear direction. The second fixing portion 44 thus is disposed at a portion set back from the housing 42 to the exterior side in the vehicle width direction. Thus, the second fixing portion 44 is less likely to be touched by an occupant with the floor carpet 71 interposed therebetween, so that the second fixing portion 44 is prevented from being unfastened, damaged, or broken.

The technical scope of the disclosure is not limited to the above-described embodiment and includes other modifications obtained by modifying the above-described embodiment in various manners within the scope not departing from the gist of the disclosure. In other words, the components or the like described in the above-described embodiment are mere examples and may be appropriately modified.

For example, the above-described embodiment has been described a configuration in which the harness protector 41 according to the above-described embodiment of the disclosure is employed on a passenger seat of the vehicle 1. However, the disclosure is not limited to this case. Specifically, the harness protector 41 according to the embodiment of the disclosure may be employed on, for example, a driver's seat or a rear seat.

In addition, the designs of the fixing portions 43 and 44, such as the position or the number of the fixing portions 43 and 44, may be appropriately changed.

The dent resistant portion 55 may be formed throughout the length of the housing 42.

The designs of the shapes of the internal wall 52 of the housing 42 or the lower extension portion 58 of the dent resistant portion 55 may be appropriately changed in accordance with the outer shape of the floor carpet 71.

What is claimed is:

1. A harness protector disposed to a side sill of a vehicle body to hold a harness routed along the side sill in a vehicle front-rear direction, the harness protector comprising:
    a housing disposed at a vehicle interior side of the side sill in a vehicle width direction and into which the harness is inserted in the vehicle front-rear direction;
    a fastening portion disposed at an upper side of the side sill and to which a floor carpet is fastened, the floor carpet covering a vehicle interior side of the housing, thereby covering the side sill;
    a coupler that extends downward from the fastening portion to the housing and couples the housing and the fastening portion to each other;
    a dent resistant portion disposed at a lower side of the housing and supporting the floor carpet from an exterior side in the vehicle width direction; and
    a fixing portion disposed at a lower side of the housing and at a position offset with respect to the dent resistant portion in the vehicle front-rear direction, the fixing portion fixing the housing to the side sill in the vehicle width direction.

2. The harness protector according to claim 1, further comprising another fixing portion that fixes the fastening portion onto the side sill,
    wherein the fastening portion and the another fixing portion are located at the same position in the vehicle front-rear direction.

3. The harness protector according to claim 1, wherein the housing has a first slope portion at the interior side of the housing in the vehicle width direction, the first slope portion extending obliquely downward toward the interior side in the vehicle width direction.

4. The harness protector according to claim 3, wherein the dent resistant portion has a second slope portion extending obliquely downward toward the interior side in the vehicle width direction and disposed so as to be continuous with the first slope portion.

5. The harness protector according to claim 1, wherein the dent resistant portion is disposed at a portion touchable by an occupant when a seat slidable in the vehicle front-rear direction is positioned in a rearmost position.

* * * * *